Nov. 6, 1956  A. S. BAGLEY  2,769,595
FREQUENCY COUNTER
Filed July 23, 1952  2 Sheets-Sheet 1
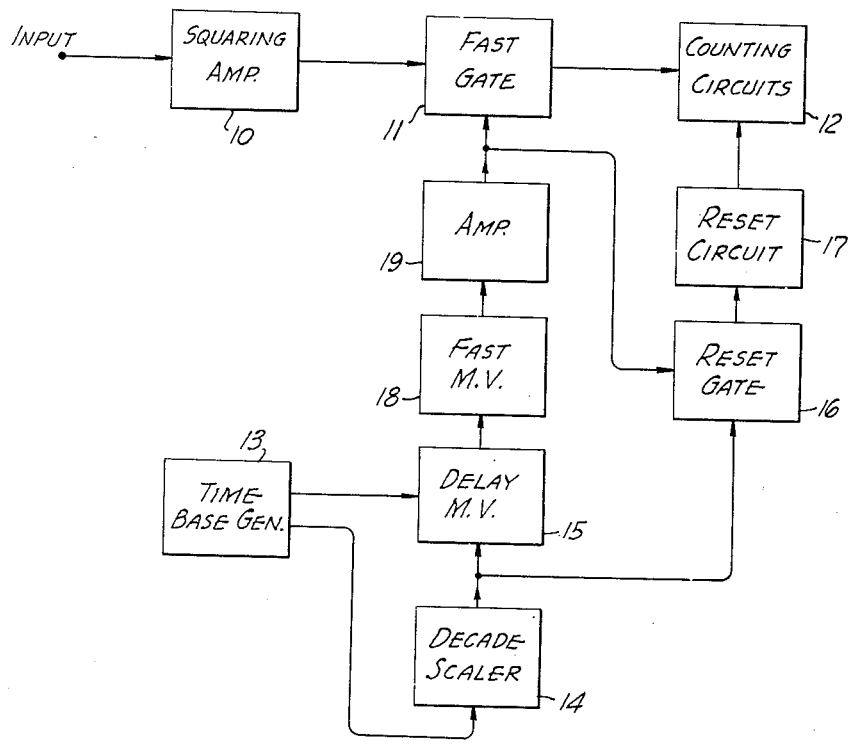
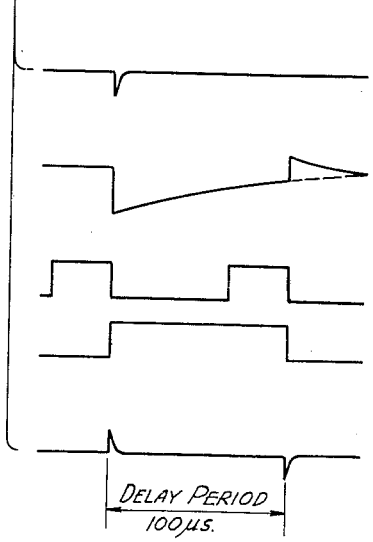
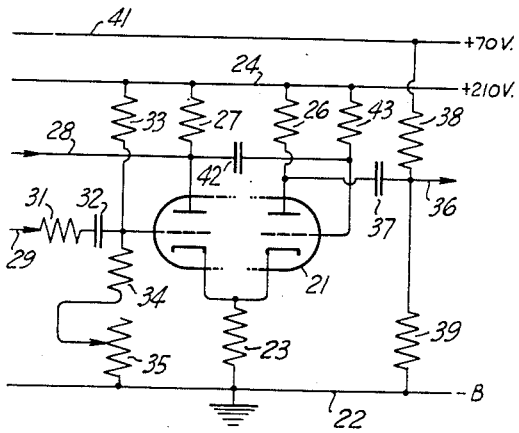
INVENTOR.
Alan S. Bagley
BY
ATTORNEYS Nov. 6, 1956   A. S. BAGLEY   2,769,595
FREQUENCY COUNTER
Filed July 23, 1952   2 Sheets-Sheet 2
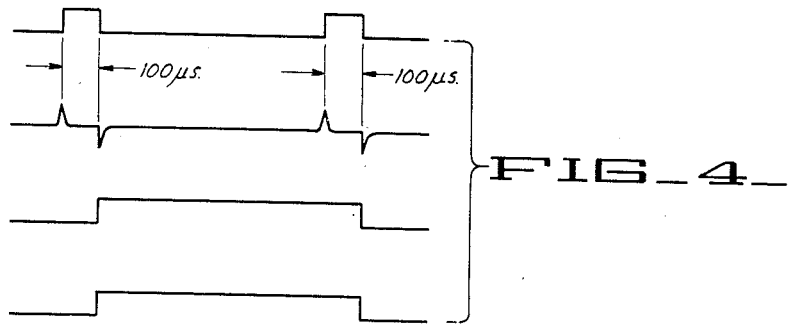
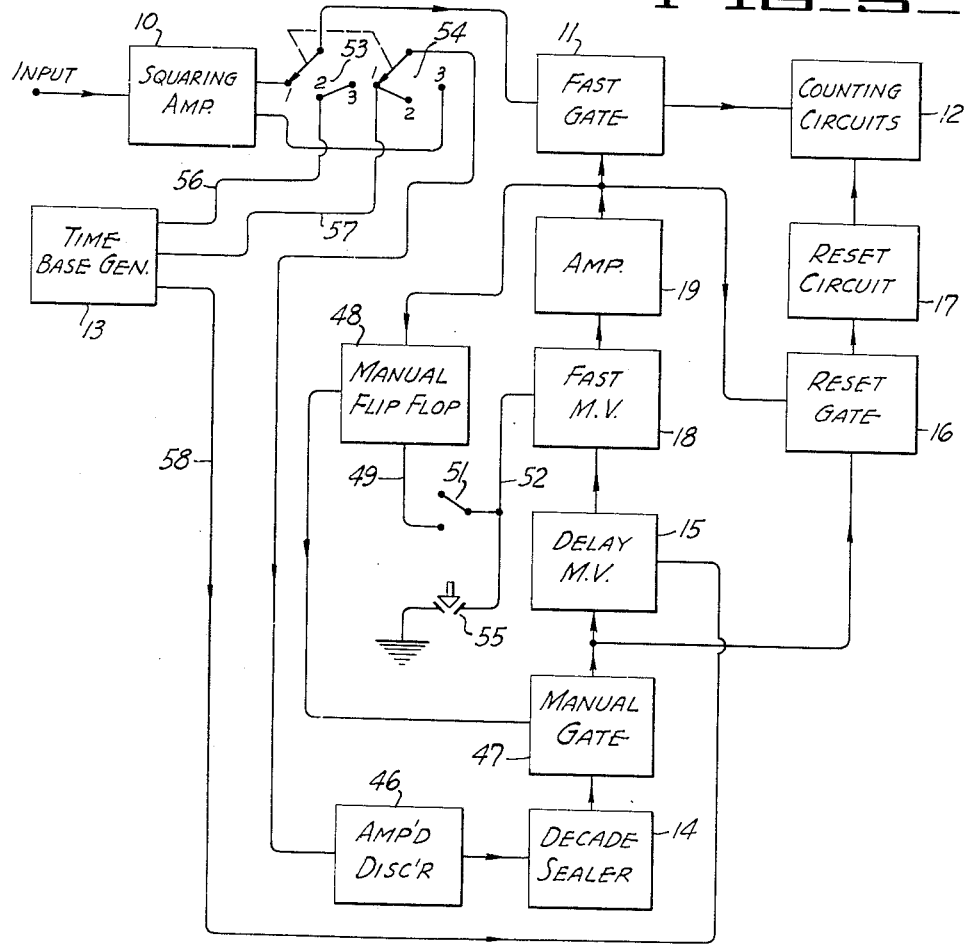
INVENTOR.
Alan S. Bagley
BY
ATTORNEYS

United States Patent Office 2,769,595
Patented Nov. 6, 1956

2,769,595
FREQUENCY COUNTER

Alan S. Bagley, Los Altos, Calif., assignor to Hewlett-Packard Company, Palo Alto, Calif., a corporation of California Application July 23, 1952, Serial No. 300,447

9 Claims. (Cl. 235—92)

This invention relates generally to electronic apparatus for frequency measurements, and particularly to apparatus of this type capable of high speed operation.

In general it is an object of the invention to provide apparatus of the above character capable of direct frequency measurements to a high degree of accuracy.

Another object of the invention is to provide apparatus of the above character which is suitable for use over a wide range of frequencies, as for example frequencies within a range from 0.01 C. P. S. to 10 megacycles.

Another object of the invention is to provide apparatus of the above character characterized by the use of a novel gating arrangement to enable a count of pulses derived for a predetermined time interval.

Another object of the invention is to provide a novel arrangement for the automatic resetting of the counters involved whereby the reading of the counters changes at recurrent intervals in accordance with changes in the input frequency.

Another object of the invention is to provide apparatus of the above character which can be readily modified for manual as well as automatic operation, and which can also be used to measure the period of a frequency.

Additional objects and features of the invention will appear from the following description in which the preferred embodiment has been set forth in detail in conjunction with the accompanying drawings.

Referring to the drawings:

Figure 1 is a schematic diagram illustrating a simplified embodiment of the invention.

Figure 2 is a circuit diagram illustrating the delayed multivibrator incorporated in Figure 1.

Figure 3 shows curves serving to illustrate operation of the delayed multivibrator.

Figure 4 shows curves illustrating the character of pulses applied to the input of amplifier 19 and to the fast gate 11 from the amplifier.

Figure 5 is a schematic diagram illustrating a more elaborate embodiment of the invention.

Apparatus in accordance with the present invention employs a suitable amplifier to which the input frequency is applied, and which provides negative output pulses having a period corresponding to the input frequency, and suitable for counting. The pulses are applied to suitable counting circuits through an electron gate, and the gate is controlled by a special gating circuit, which includes a time base generator. The gate is opened for a predetermined time interval whereby a reading is secured from the counting circuits which directly indicates the input frequency. For automatic operation the gate is opened and closed periodically and the counting circuits are automatically reset after a reading interval which follows each count.

Referring to the schematic diagram of Figure 1, apparatus in accordance with the present invention can consist of a squaring amplifier 10, to which the input frequency is applied, and which provides an output of negative pulses suitable for counting. In actual practice the squaring amplifier can consist of means for amplifying and clipping the input waveform to provide a differentiated output comprising a series of negative pulses, one pulse occurring for each input cycle. The output of the squaring amplifier 10 is applied through the so-called fast gate 11, to the counting circuit 12.

For the gate 11 I have employed one of the multigrid vacuum tube type such as disclosed in "Waveforms" by Chance, Hughes, MacNichol, Sayre and Williams, volume 19, Radiation Laboratory Series, published 1949, by McGraw-Hill Book Co., Inc. (page 381). Such a gate is capable of accurate high speed operation, and is opened and closed in accordance with application of a controlling pulse from the gating circuit to be presently described. Instead of such an arrangement I can employ a diode gate in the plate circuit of a pentode amplifier.

The base generator 13 provides a plurality of accurately controlled frequencies. It can consist of a suitable crystal controlled oscillator together with a series of frequency dividers of the phantastron type. In practice I have used a generator producing 100 kc. and 10 kc. signals, and which also supplies, under the control of a selector switch, any one of 1 kc., 100 C. P. S., 10 C. P. S., and 1 C. P. S. signals. One of the selected signals determines the period for which the fast gate remains open in making a count. All of the frequencies from the base generator are preferably of square wave form.

A selected frequency from the time base generator 13 is applied to the decade scaler 14, which in turn provides timed pulses for controlling the gating circuit. A conventional decade scaler of the electronic type can be employed. Assuming that the frequency supplied from the generator 13 is of rectangular wave form, the decade scaler includes a suitable triggering circuit to provide negative pulses corresponding to the applied frequency from the time base generator. The output of the decade scaler provides one pulse for each ten input pulses.

The output of the decade scaler 14 is applied both to the delay multivibrator 15, and the reset gate 16. Pulses fed to the reset gate 16 are applied to the counting circuits through the reset circuit 17 when this gate is open. Pulses from the delay multivibrator 15 are applied to the fast multivibrator 18, and from the fast multivibrator, pulses are applied to the fast gate 11, by way of the amplifier 19.

The delay multivibrator 15 is constructed in such a manner that when triggered by a pulse, it provides an output pulse a predetermined time interval after receipt of the input pulse. In order to overcome any time jitter in the trigger pulses or in the time delay, the delay multivibrator is supplied with a fixed controlling frequency from the time base generator 13, as for example a frequency of 10 kc. In practice I have used a delay multivibrator of the electronic type incorporating time delay means, and responsive to pulses from the decade scaler 14, and voltage from the time base generator.

A suitable delay multivibrator which has been used with good results is illustrated in Figure 2. It consists of a double element vacuum tube 21, having its two cathodes connected together and to the grounded minus B battery lead 22, through the biasing resistor 23. The positive plate voltage supply lead 24 is connected to the right plate of the tube through resistor 26, and to the left plate through resistor 27. Lead 28 serves to apply triggering pulses to the right control grid of the tube, and lead 29 supplies time interval determining voltage from the time base generator 13. Lead 29 is coupled to the left grid of the tube through the resistor 31 and condenser 32. Series resistors 33, 34 and 35 connect between leads 24 and 22, and the point of connection between resistors 33 and 34 is also connected to the left grid. The output lead 36 is coupled to the right plate of the tube. Thus lead 36 is coupled to the right plate of the tube through the condenser 37, and is also connected between series resistors 38 and 39, the latter being connected between the positive voltage supply lead 41, and the lead 22. A condenser 42 connects from the left plate and lead 28 to the right control grid. Also the right control grid is connected to the voltage supply lead 24 through the resistor 43. Condenser 42 and resistor 43 provide a time delay constant which is always greater than the counting interval.

The multivibrator illustrated in Figure 2 operates as follows: It will be assumed that a 10 kc. square wave is being applied to the lead 29, from the time base generator 13, and the negative triggering pulses are being applied to the lead 28 from the decade scaler 14. By way of example, the time interval or period of such pulses can be one second. Immediately prior to applying a pulse to lead 28, the right section of tube 21 is conducting. When a pulse is applied to lead 28 from the decade scaler 14, the right control grid is driven negative thus cutting off the right half of the tube. This causes a rise in the plate voltage of the right half of the tube, and provides a positive pulse output. After such a negative pulse has been applied to lead 28, the voltage upon the right control grid gradually becomes less negative, due to the multivibrator action through the time constant of condenser 42 and resistor 43. Assuming that the apparatus is functioning with a time delay interval of 100 microseconds, the time constant of condenser 42 and resistor 43 are such as to permit the tube to flip back to its original condition after an interval somewhat greater than 100 microseconds, as for example, from 110 to 120 microseconds. However the transition back to the original condition is caused to occur approximately 100 microseconds after receipt of the triggering pulse, and to be synchronized precisely with the time base generator by virtue of the rectangular wave applied to lead 29. The negative pulses applied to lead 29 occur every 100 microseconds, and are applied to the left control grid through the resistor 31 and condenser 32. The left half of the tube amplifies the signal, and the amplified output is applied to the right control grid through condenser 42. When the signal applied to lead 29 goes positive at the end of 100 microseconds, it positively flips the tube 21 back to its original state, by instantly raising the voltage on the right control grid.

The curves of Figure 3 serve to illustrate the operation of Figure 2. The first curve represents a triggering pulse applied to lead 28 from the decade scaler 14. The second curve illustrates the grid voltage of the right half of tube 21 and the third curve represents the 10 kc. square wave applied to the lead 29. The fourth curve represents the output voltage on the right plate of tube 21, and the last curve represents the output pulses applied to lead 36, after differentiation of the output by condenser 37 and resistor 38.

In one particular instance a delay multivibrator was constructed in accordance with Figure 2, making use of a tube known by manufacturers' specifications as No. 5963. The resistors had values as follows: 31, 27 K (K equals 1,000 ohms); 33, 820 K; 34, 120 K; 35, 50 K; (maximum); 27, 82 K; 26, 1.29 (megohms); 38, 150 K; 23, 18 K; 39, 5,600 ohms. Condensers 32, 42 and 37 had values respectively of 15 f., 220 f., and 10 f.

The delay multivibrator illustrated in Figure 2 provides a highly accurate means for securing a predetermined time delay. The extent of the time delay is determined by the frequency applied to lead 29 from the time base generator. Synchronization with the time base signal serves to overcome any time jitter in both the trigger pulses and the time delay.

The fast multivibrator 18 should be one capable of functioning without appreciable time delay. For this purpose I have utilized a multivibrator having both plate and grid clamping such as disclosed in the aforementioned publication of Wave Forms, page 607. Plate clamping can be such that only a limited voltage swing is obtained between conducting and non-conducting conditions of the multivibrator tubes. Such clamping is desirable because it makes operation of the multivibrator substantially independent of normal variations in tube characteristics. Also, plate clamping provides a more desirable rise and decay characteristic and permits a favorable intermediate portion of the characteristic curve to be used. Clamping of the grids tends to make operation of the multivibrator relatively immune to varying tube characteristics, and also it tends to reduce inherent time delay for a switching operation.

Amplifier 19 is preferably of the cathode follower type and serves to isolate the multivibrator 18 from load effects and to provide a low impedance output. It supplies the gate 11 with a positive signal pulse during the time this gate is held open. In Figure 4, the first curve represents the output of the delay multivibrator 15, and the second curve is the differentiated output applied to the lead 36 and to the fast multivibrator 18. The third curve represents the output of the fast multivibrator 18, and the fourth curve represents the output of the cathode follower amplifier 19 which is applied to the gate 11. Apparatus which I have constructed has such characteristics that the decay and rise time for the last curve of Figure 4 is less than 0.1 microsecond. The gate 11 remains open for the full period that the signal indicated in the last curve of Figure 4 is applied.

As illustrated in Figure 1, the output signal from amplifier 19 not only operates the gate 11, but also the reset gate 16. When gate 11 is closed the reset gate 16 is open. When gate 16 is open a negative pulse from decade scaler 14 is applied to the reset circuit 17. The reset circuit 17 can be one of the thyratron type, in which a thyratron tube is fired by pulse received from the reset gate 16, to thereby provide a negative pulse for application to the counting circuits 12 which is of sufficient amplitude to reset these circuits. Actually it is desirable for the indicating means associated with the counting circuits, to be reset to a reading of minus 1. This is necessary to offset an extra pulse which is applied to the counter, upon closing the fast gate 11.

The counting circuits 12 can in practice consist of eight decade counters of the electronic type, such as are used in digital computers and nuclear instruments. All or a part of the counters may be of the high speed type, as disclosed in my copending application Serial No. 227,493, filed May 21, 1951. Counters of the "Berkeley" type are suitable for the slower counters.

Each decade counter divides the applied frequency of the incoming pulses by 10 and presents the lower frequency at its output. Suitable indicating means is associated with the decade counters, whereby the number of input pulses received by each counter is indicated and displayed visually.

Operation of the complete apparatus illustrated in Figure 1 is as follows: The unknown frequency is applied to the squaring amplifier 10, and the pulses from the output of this amplifier are applied to the gate 11. During intervals that gate 11 is open, such pulses are applied to the counting circuits 12. The time base generator 13 applies one constant frequency to the delay multivibrator 15, and another selected frequency to the decade scaler 14. By way of example, the frequency applied to the multivibrator 15 can be 10 kc., and the frequency applied to the decade scaler 14 can be such as to provide a time interval of one second between output pulses from the scaler. A negative pulse from scaler 14 triggers the delay multivibrator 15, and approximately 100 microseconds after such triggering, the delay multivibrator is restored. The negative pulse from the output of the delayed multivibrator 15 operates the fast multivibrator 18, and the amplified pulse from 19 is fed to both the fast gate 11 and the reset gate 16. If reset gate 16 is open at the time the pulse is initially supplied from the decade scaler 14, then the reset circuit 17 is operated to reset the counting circuits 12. Because of the delay period afforded by the delay multivibrator 15, multivibrator 18 is triggered 100 microseconds after the pulse is applied by the scaler to the delay multivibrator. Triggering of the multivibrator 18 opens the gate 11, and closes the reset gate 16. Since the counting circuits have been cleared and reset they are now ready to count the unknown frequency admitted through the gate 11 from the squaring amplifier 10.

The next pulse from the decade scaler 14 finds the resetting gate closed, but triggers the delay multivibrator. After the fixed delay of 100 microseconds, the delay multivibrator operates through the fast bistable multivibrator 18 to open the resetting gate and to close the fast gate 11. The counting circuits then display the counted value until the next pulse from the decade scaler causes the entire process to be repeated.

It will be evident from the foregoing that my apparatus can be arranged to count unknown frequencies for alternate predetermined time intervals of say 10, 1, 0.1, 0.01, or 0.001 seconds as desired. The apparatus can be arranged to display the count visually, with the counting process being repeated automatically as long as desired.

My counter has wide industrial application, including use in laboratories and as a production tool. For example, it can be used to calibrate oscillators, measure frequency drift, and for production applications involving calibration and tuning of instruments. When employed with suitable auxiliary equipment, such as a proper light source and phototube, it can be used to measure precisely the speed of rotation of various appliances, such as motors and centrifuges.

Figure 5 illustrates a more elaborate embodiment of the invention in which the apparatus can be used for manual as well as automatic counting, and which permits additional operations as will be presently described. All of the pieces of equipment illustrated in Figure 1 are incorporated in Figure 5. An amplitude discriminator 46 or triggering circuit is shown inserted in the lead to the decade scaler 14. This amplitude discriminator provides pulses for operation of the scaler, from either the unknown frequency, or a frequency from the time base generator 13. A so-called manual electronic gate 47 is inserted between the decade scaler 14 and the delay multivibrator 15. A manual electronic flip-flop 48 has an output lead connected to the manual gate 47, and an input lead connected to the output from the amplifier 19. Another lead 49 from the manual flip-flop 48 is connected to a contact of the push button switch 51, and the arm of this switch connects by lead 52 with the fast multivibrator 18. The two switches 53 and 54 can be gang controlled and serve as change-over switches for frequency or period measurements. Contact 1 of switch 53 is connected to an output lead from the squaring amplifier 10. Another output lead from the squaring amplifier connects with the contact 3 of switch 54. The arm of switch 53 connects with the fast gate 11, and the arm of switch 54 connects to the input of the amplitude discriminator 46. The lead 56 from the time base generator 13 connects to contact 2 of switch 53, and lead 57 connects with contact 1 of switch 54. An additional lead 57 from the time base generator connects with the delay multivibrator 15. Contacts 2 and 3 of switch 53 and also the contacts 1 and 2 of switch 54, are shunted together.

Operation of the circuit illustrated in Figure 5 is as follows: When the switches 53 and 54 are in position No. 1, or in other words when the arms of these switches connect with contacts 1, the operation is the same as described with reference to Figure 1. In other words the counters repeatedly indicate the contact frequency, and after each indicating interval, the counters are cleared. When switches 53 and 54 are placed in their third positions, a frequency such as 100 kc. is supplied from the time base generator by way of lead 56 to the fast gate 11, and the unknown frequency from the squaring amplifier 10 is applied to the amplitude discriminator 46 and the decade scaler 14. Under such operating conditions 10 cycles of the unknown frequency produce a pulse from the decade scaler 14, to perform the gating and resetting operations previously described. A known fixed frequency such as 100 kc. is applied to the counters 12. Thus under such conditions the apparatus is employed for counting the period of the unknown frequency. Such measurements are desirable with the lower frequencies, as for example for frequencies ranging from 316 C. P. S. to 0.01 C. P. S.

The second operating position of switches 53 and 54 is for certain checking operations.

The apparatus of Figure 5 can also be used for manual operation, as well as automatic. For manual operation switch 51 is closed to connect leads 49 and 52. The manual flip-flop 48 is now in such condition that it is responsive to either a pulse from the amplifier 19, or from the switch 55. Also pushing the switch 55 causes the flip-flop 48 to be triggered to the state which holds the manual gate 47 open. The flip-flop is triggered to its opposite state by a negative pulse from the cathode follower amplifier 19. Also by pressing the push button switch 55, the fast gate 18 is closed, if it is not already in the closed state.

Assuming that one wishes to proceed with taking a manual reading, the switch 55 is momentarily closed, the fast gate 18 is thereby closed if not previously in a closed state, and the manual gate 47 is opened. The first pulse which comes through the manual gate resets the counting circuits to erase the previous reading. Also it opens the fast gate 11 and starts a new count. The next pulse coming through the manual gate 47 causes the fast gate 11 to be closed, thus ending the count, and also causing the manual gate to be triggered to closed position, by virtue of operation of the manual flip-flop 48. In the operation just described, the subsequent timing pulses are prevented from recurrently triggering the fast gate, and therefore the resulting reading is displayed until the switch 55 is again closed. It will be noted that when the switch 55 is closed, the count does not begin until the first timing pulse from the output of the scaler 14 is received. To minimize this delay, the push button switch may also be connected to the scaler 14 whereby pressing the button also resets the scaler to a state just preceding its output pulse.

I claim:

1. A frequency counter comprising pulse counting means, an electronic gate serving to control application of pulses to the counting means, means for supplying pulses to the gate at a frequency corresponding to the unknown frequency, a time base generator for generating at least two first and second timing pulses separated by a predetermined period, said period corresponding to a desired counting time, and means responsive to said pulses serving to cause opening and closing of said gate and resetting of the counting means, said last means including means for imposing a predetermined time delay between resetting of said counting means and the opening of said gate responsive to the first pulse and for imposing a like time delay between the second pulse and closing of said gate.

2. A frequency counter as in claim 1 in which said delay means comprises a multivibrator adapted to be triggered by a timing pulse applied to the same and adapted to provide an output pulse a predetermined time interval following the timing pulse.

3. A frequency counter comprising pulse counting means, a fast operating electronic gate serving to control application of pulses to the counting means, means for supplying pulses to the gate at a frequency corresponding to the unknown frequency, said fast gate being opened and closed by application of pulses to the same, a time base generator adapted to generate constant frequencies, a scaler having its input connected to the time base generator whereby a generated frequency triggers the scaler and provides triggering pulses from the output of the scaler, the triggering pulses being separated by a predetermined time period, an electronic reset gate connected to the output of the scaler, means effectively connecting the output of the reset gate to said counting means whereby a pulse passed through the reset gate is applied to the counting means for resetting of the same, a delay multivibrator connected to receive triggering pulses from the scaler, a fast multivibrator connected to receive triggering pulses from the delay multivibrator, means serving to effectively apply pulses from the output of the fast multivibrator to both the fast gate and said reset gate, whereby pulses from the fast multivibrator serve to open and close the fast gate and also to close and open the reset gate, successive pulses from the fast multivibrator being delayed with respect to the scaler triggering pulses by predetermined and equal delay periods whereby the counting period is started and stopped accordingly.

4. A frequency counter as in claim 3 in which the delay multivibrator is connected to the time base generator to receive signal voltage of constant frequency from the same, said voltage serving to restore the delay multivibrator after triggering of the same, with a predetermined time interval between triggering and restoration.

5. A frequency counter as in claim 3 together with switching means for applying a known frequency to the counting means through the first named gate, and for applying an unknown frequency to said scaler.

6. A frequency counter as in claim 3 together with a manual electronic gate imposed between the scaler and the delay multivibrator, and a manual electronic flip-flop connected to apply a controlling pulse to the manual gate and to receive a triggering pulse from the fast multivibrator, said manual flip-flop enabling a count to be manually initiated, and to hold a count at the end of a counting interval.

7. A frequency counter comprising pulse counting means, an electronic gate serving to control application of pulses to the counting means, means for supplying pulses to the gate at a frequency corresponding to the unknown frequency, means for continuously generating timing pulses separated by a predetermined period, said period corresponding to alternate counting and indicating periods, means responsive to said timing pulses serving to cause sequential opening and closing of said gate and resetting of the counting means immediately prior to the commencement of a counting period, said last means including means for imposing a predetermined time delay between application of each timing pulse and the opening and closing of said gate, alternate periods between the said timing pulses providing an interval for holding the count provided by said counting means.

8. A frequency counter comprising pulse counting means, a fast operating electronic gate serving to control application of pulses to the counting means, means for supplying pulses to the gate at a frequency corresponding to the unknown frequency, said fast gate being opened and closed by application of sequential pulses to the same, a time base generator adapted to generate at least two constant frequencies, a scaler having its input connected to the time base generator whereby one generated frequency triggers the scaler and provides triggering pulses from the output of the scaler, the triggering pulses being separated by a predetermined time period, an electronic reset gate connected to the output of the scaler, means effectively connecting the output of the reset gate to said counting means whereby a pulse passed through the reset gate is applied to the counting means for resetting of the same, a delay multivibrator connected to receive triggering pulses from the scaler, means for applying triggering voltage from the base generator to the delay multivibrator, said last voltage being of a frequency differing from said one frequency, means serving to effectively apply pulses to both the fast gate and the said reset gate in accordance with pulses from the output of the delay multivibrator, whereby such pulses serve to sequentially open and close the fast gate and also to close and open the reset gate, said last named pulses being delayed with respect to the scaler triggering pulses by predetermined and equal delay periods established by said delay multivibrator whereby the counting period during which the fast gate is open is equal to the period between the triggering pulses from the scaler.

9. A frequency counter is in claim 8 in which the scaler supplies a continuous series of triggering pulses to the delay multivibrator, whereby a count takes place during alternate intervals between such pulses and an indication of the counting means is held during the intervening periods.

References Cited in the file of this patent

UNITED STATES PATENTS

| | | |
|---|---|---|
| 2,403,918 | Grosdoff | July 16, 1946 |
| 2,407,320 | Miller | Sept. 10, 1946 |
| 2,516,189 | Dinsmore | July 25, 1950 |
| 2,576,900 | Brockman | Nov. 27, 1951 |

OTHER REFERENCES

Potter Instrument Co. Catalogue, received April 10, 1951, pages 21 and 22.